(12) United States Patent
Kudinov et al.

(10) Patent No.: US 12,718,140 B2
(45) Date of Patent: Aug. 25, 2026

(54) DISTRIBUTED TRAINING OF MACHINE LEARNING MODELS FOR PERSONALIZATION

(71) Applicant: SAMSUNG ELECTRONICS CO., LTD., Suwon-si (KR)

(72) Inventors: Mikhail Sergeevich Kudinov, Moscow (RU); Irina Igorevna Piontkovskaya, Moscow (RU); Aleksei Yurievich Nevidomskii, Moscow (RU); Vadim Sergeevich Popov, Moscow (RU); Petr Konstantinovich Vytovtov, Moscow (RU); Dmitry Valerievich Polubotko, Moscow (RU); Olga Valerievna Malyugina, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1120 days.

(21) Appl. No.: 17/413,897

(22) PCT Filed: Dec. 13, 2019

(86) PCT No.: PCT/KR2019/017707

§ 371 (c)(1),
(2) Date: Jun. 14, 2021

(87) PCT Pub. No.: WO2020/122669

PCT Pub. Date: Jun. 18, 2020

(65) Prior Publication Data

US 2022/0058524 A1 Feb. 24, 2022

(30) Foreign Application Priority Data

Dec. 14, 2018 (RU) ........................... RU2018144318

(51) Int. Cl.
*G06N 20/00* (2019.01)

(52) U.S. Cl.
CPC .................................... *G06N 20/00* (2019.01)

(58) Field of Classification Search
CPC ........ G06N 20/00; G06N 3/044; G06N 3/084; G06N 20/20; G06N 3/0442; G09B 9/00
See application file for complete search history.

(56) References Cited

U.S. PATENT DOCUMENTS 8,429,103 B1 4/2013 Aradhye et al.
8,429,106 B2 4/2013 Downs et al.
(Continued)

FOREIGN PATENT DOCUMENTS

CN 107885762 A 4/2018
GB 2550682 A 11/2017
(Continued)

OTHER PUBLICATIONS

Retrospective User Input Inference and Correction (Year: 2018).*
(Continued)

*Primary Examiner* — Mohamed Abou El Seoud
(74) *Attorney, Agent, or Firm* — Sughrue Mion, PLLC

(57) ABSTRACT

A user equipment (UE) may include a communication circuit; and at least one processor configured to: obtain user generated data based on user input of a user of the UE; receive, via the communication circuit, training data from a server connected to the UE, wherein the training data includes publicly available data train a machine learning (ML) model based on the user generated data and the training data until a training stop criterion is met, wherein the training stop criterion includes at least one of an achieved convergence of ML models among one or more UEs including the UE, a predetermined ML model quality characteristic value being achieved by the ML model, or an
(Continued)

achieved predetermined number of training periods; and transmit, via the communication circuit, the ML model to the server.

17 Claims, 3 Drawing Sheets

(56) References Cited

U.S. PATENT DOCUMENTS

| | | | |
|---|---|---|---|
| 8,893,032 B2 | 11/2014 | Bruck et al. | |
| 9,026,479 B1 | 5/2015 | Baluja et al. | |
| 9,105,046 B1 | 8/2015 | Dias et al. | |
| 9,183,259 B1 | 11/2015 | Marra et al. | |
| 9,224,100 B1 | 12/2015 | Chatterjee et al. | |
| 9,743,458 B2 | 8/2017 | Jain et al. | |
| 9,836,484 B1 | 12/2017 | Bialynicka-Birula et al. | |
| 11,403,540 B2 * | 8/2022 | Sanketi | G06N 5/048 |
| 2013/0346347 A1 | 12/2013 | Patterson et al. | |
| 2015/0242760 A1 | 8/2015 | Miao et al. | |
| 2015/0317398 A1 | 11/2015 | Phillips | |
| 2016/0139582 A1 | 5/2016 | Matsuoka et al. | |
| 2016/0197865 A1 | 7/2016 | Kim | |
| 2016/0305681 A1 | 10/2016 | Matsuoka et al. | |
| 2016/0342389 A1 | 11/2016 | Weinstein et al. | |
| 2016/0358098 A1 | 12/2016 | Duesterwald et al. | |
| 2017/0177723 A1 | 6/2017 | Price et al. | |
| 2018/0032871 A1 | 2/2018 | Holt et al. | |
| 2018/0150728 A1 * | 5/2018 | Vahdat | G06N 3/08 |
| 2019/0087383 A1 | 3/2019 | Zhou et al. | |
| 2019/0378028 A1 * | 12/2019 | Chaudhuri | G06N 5/048 |
| 2019/0385043 A1 * | 12/2019 | Choudhary | G06F 13/4213 |
| 2020/0134490 A1 * | 4/2020 | Chen | G06Q 30/02 |
| 2020/0219014 A1 | 7/2020 | Verma et al. | |

FOREIGN PATENT DOCUMENTS

| | | | |
|---|---|---|---|
| RU | 2673708 | C1 | 11/2018 |
| RU | 2686006 | C1 | 4/2019 |
| WO | 2017132590 | A1 | 8/2017 |
| WO | 2017176356 | A2 | 10/2017 |
| WO | 2018125264 | A1 | 7/2018 |
| WO | 2018213205 | A1 | 11/2018 |

OTHER PUBLICATIONS

"Applied Federated Learning: Improving Google Keyboard Query Suggestions" (Year: 2018).*

What is a MAC Address, https://www.brainboxes.com/faq/what-is-a-mac-address.*

Communication dated May 9, 2022 issued by the European Patent Office in EP Application No. 19897515.3.

Hard et al., "Federated Learning for Mobile Keyboard Prediction", Nov. 8, 2018, arXiv:1811.03604v1 [cs.CL], 7 pages total.

Yoon et al., "Efficient Transfer Learning Schemes for Personalized Language Modeling using Recurrent Neural Network", Jan. 13, 2017, arXiv:1701.03578v1, 7 pages total.

Yang et al., "Applied Federated Learning: Improving Google Keyboard Query Suggestions", Dec. 7, 2018, arXiv:1812.02903v1 [cs.LG], 9 pages total.

International Search Report (PCT/ISA/210) dated Mar. 24, 2020 issued by the International Searching Authority in International Application No. PCT/KR2019/017707.

Written Opinion (PCT/ISA/237) dated Mar. 24, 2020 issued by the International Searching Authority in International Application No. PCT/KR2019/017707.

Communication issued on Oct. 11, 2023 by the European Patent Office for European Application No. 19897515.3.

Communication dated Jun. 27, 2024, issued by the Chinese Patent Office in Chinese Application No. 201980082850.1.

Yang et al., "Applied Federated Learning Improving Google Keyboard Query Suggestions", Google LLC, 2018, arXiv:1812.02903v1 [cs.LG] Dec. 7, 2018 (9 pages total).

Nguyen et al., "DioT: A Self-learning System for Detecting Compromised IoT Devices", ArXiv, May 11, 2018, 18 total pages, arXiv:1804.07474v2, XP093266365.

Office Action dated Apr. 8, 2025, issued by European Patent Office in European Patent Application No. 19897515.3.

Office Action dated Jan. 23, 2025, issued by Chinese Patent Office in Chinese Patent Application No. 201980082850.1.

* cited by examiner

DISTRIBUTED TRAINING OF MACHINE LEARNING MODELS FOR PERSONALIZATION

CROSS-REFERENCE TO RELATED APPLICATION(S)

This application is a National Stage Entry of International Application No. PCT/KR2019/017707, filed on Dec. 13, 2019, which claims priority from Russian Patent Application No. RU20180144318, filed on Dec. 14, 2018 in the Russian Patent Office, the disclosures of which are incorporated by reference herein in their entireties.

BACKGROUND

1. Field

The present disclosure relates to the field of artificial intelligence and, in particular, to machine learning models for personalizing user equipment.

2. Description of Related Art

Related art discloses a method of training a machine learning (ML) model performed in a user equipment such as a mobile phone, while obtaining data items from mobile applications or a network. The machine learning method may comprise determining at least one feature based on received data and generating output data by performing a machine learning operation on said at least one feature. Output data may be provided to an application, to a network etc. A data aggregation and representation engine (DARE) may be provided, which constantly receives and stores input data, perhaps from multiple sources. The stored input data can be aggregated to discover features within the data. For example, the related art machine adaptation techniques can use incremental learning algorithms that require limited or no historical information for training.

Related art discloses an approach to so-called “deep learning” model training that leaves training data distributed on the mobile devices, and learns a shared model by aggregating locally-computed updates. To improve communication of distributed stochastic gradient descent, several workarounds are used: sending only sufficiently large weight updates, momentum correction, local gradient clipping, momentum factor masking, local gradient accumulation and less aggressive gradient reduction during warm-up training. The approach was tested in the context of image, speech and text data processing.

The above approach may be taken as the closest analogue of the claimed subject matter.

Other related art has drawbacks, such as the field of application being restricted to mobile phones only, the need for collecting user personal data, as well as a risk of so-called “overfitting” of the model (e.g., an unwanted phenomenon which occurs when a probability of errors for the trained algorithm on test data set entities is significantly higher than mean error for a training data set).

Other related art has drawbacks, such as model “overfitting” on new data, a need for a user to wait for the training to complete until a better performing model is provided to the user, and the training method being constrained to stochastic gradient descent (SGD).

SUMMARY

This section, which discloses various aspects and embodiments of the claimed subject matter, is intended for presenting brief characteristics of the claimed subject matter and their embodiments. Detailed characteristics of technical means and methods to implement the combinations of features of the claimed subject matter are provided below. Neither this summary of the present disclosure nor the detailed description and accompanying drawings provided below shall be considered as a restriction to the scope of the claimed subject matter. The scope of legal protection of the claimed subject matter is only defined by the appended claims.

Taking into account the aforementioned deficiencies of the related art, an object of the present disclosure includes providing a solution which is directed to eliminating the above-mentioned drawbacks, reducing the risk of user personal data safety breach, and reducing expenses of data transmission over network connections for the purpose of machine learning models training for personalizing user equipment. The claimed subject matter eliminates the risk of model “overfitting,” which in this case may also be referred to as “forgetting.” The claimed solution enables grouping users according to their topics of interest. Technical results achieved by the claimed subject matter includes improved quality of training personalized artificial intelligence models while preventing their “overfitting” and reducing the expenses for data transmission over network connections.

According to an aspect of an example embodiment, a user equipment (UE) may include a communication circuit; and at least one processor configured to: obtain user generated data based on user input of a user of the UE; receive, via the communication circuit, training data from a server connected to the UE, wherein the training data includes publicly available data train a machine learning (ML) model based on the user generated data and the training data until a training stop criterion is met, wherein the training stop criterion includes at least one of an achieved convergence of ML models among one or more UEs including the UE, a predetermined ML model quality characteristic value being achieved by the ML model, or an achieved predetermined number of training periods; and transmit, via the communication circuit, the ML model to the server.

The at least one processor may be configured to identify a personalization group for the user of the UE based on the user generated data of the UE; and receive an updated ML model based on the personalization group.

The ML model may be configured to predict first words and phrases of text input to the UE, wherein the user generated data includes second words and phrases input by the user of the UE.

The ML model is configured to identify first objects in first images acquired from one or more cameras of the UE, wherein the user generated data includes second images from the one or more cameras of the UE or tags assigned by the user of the UE to second objects which are present in the second images.

The ML model may be configured to recognize first handwritten input received from the user via a touchscreen of the UE or a touchpad of the UE, wherein the user generated data includes second handwritten input by the user of the UE or a selection by the user of variants of characters or words suggested by the ML model based on the second handwritten input from the user.

The ML model may be configured to recognize first voice input received from the user of the UE by one or more microphones of the UE, wherein the user generated data includes second voice input and/or a by the user of selection of variants of words or phrases suggested by the ML model based on the second voice input from the user.

The ML model may be configured to recognize one or more characteristics of an environment of the UE or one or more user actions, wherein the one or more characteristics of the environment of the UE include a time, a date, a weekday, an illumination, a temperature, a geographical location, or a spatial position of the UE, and wherein the user generated data includes a user input to one or more applications of the UE.

According to an aspect of an example embodiment, a method for distributed training of an artificial intelligence (AI) machine learning (ML) model may include obtaining, by a user equipment (UE), user generated data based on user input of a user of the UE; receiving, by the UE, training data from a server, wherein the training data includes publicly available data; training, by the UE, the AI ML model based on the data and the training data until a training stop criterion is met, wherein the training stop criterion includes at least one of an achieved convergence of AI ML models among one or more UEs including the UE, a predetermined AI ML model quality characteristic value being achieved by the AI ML model or an achieved predetermined number of training periods; and transmitting, by the UE, the AI ML model to the server.

According to an aspect of an example embodiment, a non-transitory computer-readable medium may store instructions that cause the one or more processors to: obtain user generated data based on user input of a user of the UE; receive, via a communication circuit, training data from a server connected to the UE, wherein the training data includes publicly available data; train a machine learning (ML) model based on the user generated data and the training data until a training stop criterion is met, wherein the training stop criterion includes at least one of an achieved convergence of ML models among one or more UEs including the UE, a predetermined ML model quality characteristic value being achieved by the ML model, or an achieved predetermined number of training periods; and transmit, via the communication circuit, the ML model to the server.

Additional personalization of trained ML models is thus achieved, and accuracy of ML models for different groups of users is improved.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
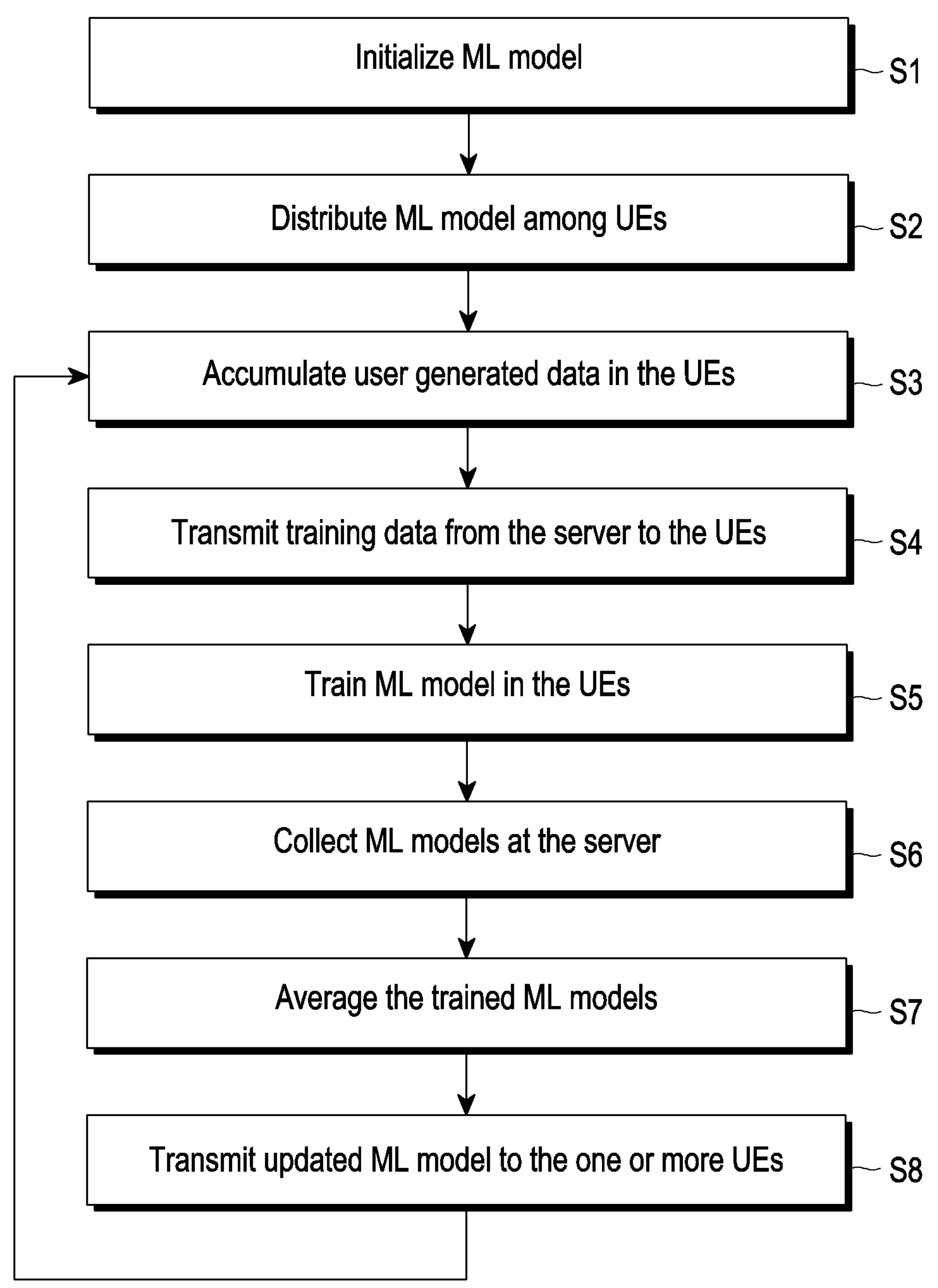
FIG. 1 shows a flowchart of a method for distributed training of a machine learning (ML) model in accordance with the first aspect of the present disclosure.
Figure 2:
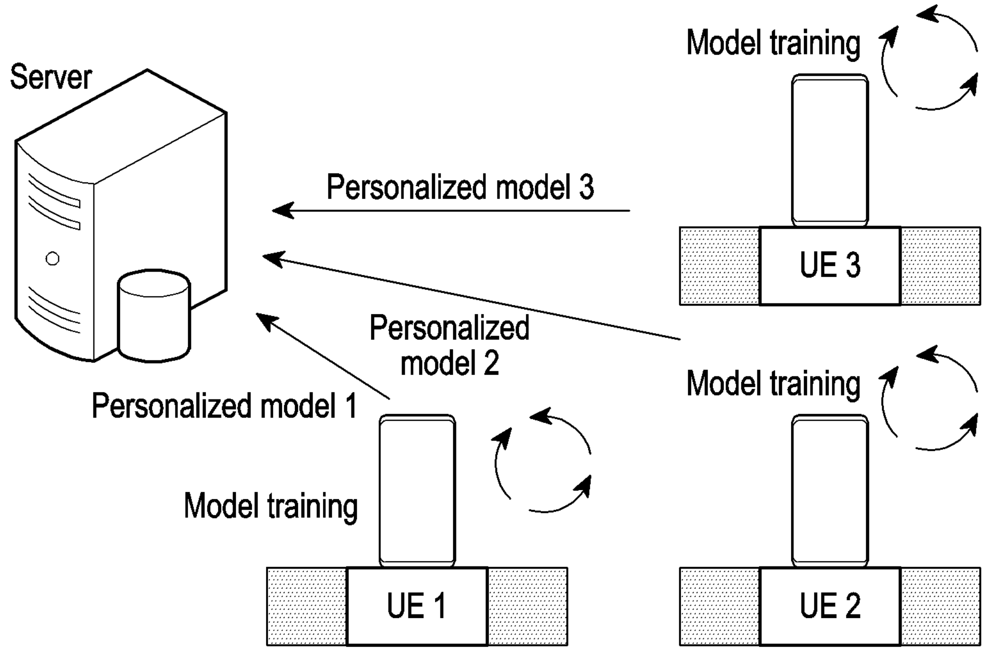
FIG. 2 illustrates the process of training ML models in user equipment (UEs) and accumulating personalized ML models in a server according to the present disclosure.
Figure 3:
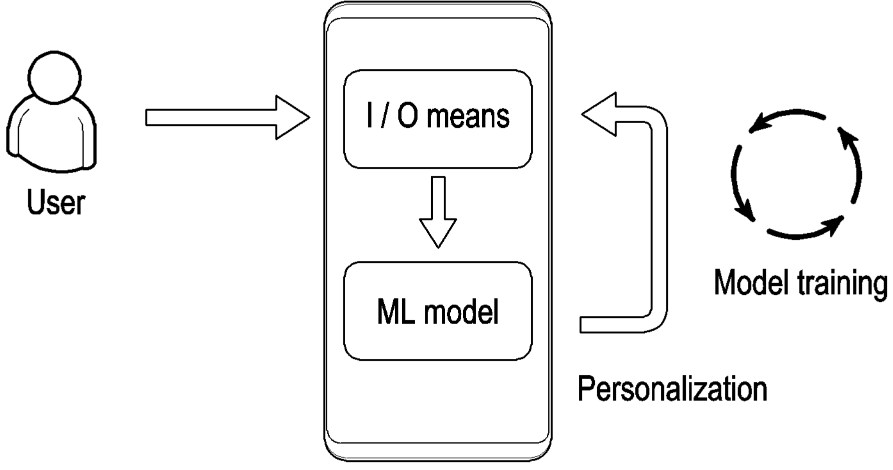
FIG. 3 schematically illustrates ML model training in a UE in accordance with the present disclosure.

Machine learning is a class of artificial intelligence methodologies, which is characterized by learning in the process of applying solutions of a plurality of similar problems instead of directly solving a problem. In a particular case, a number of machine learning methodologies are based on using neural networks, however other methodologies which use a notion of training data set also exist. In the context of the present disclosure, machine learning methodologies may be used, as a non-limiting example, for the purpose of object recognition (e.g., in images), word prediction (e.g., in various applications where a user inputs messages or search queries via an application interface in a user equipment), smart processing of super-resolution images, speech recognition (e.g., in applications which receive voice input from a user and convert voice input data into a text), handwritten text recognition (e.g., in applications which receive user input by writing letters and other characters on a touchscreen of the user equipment by means of a pen or user's finger), as well as in different software applications referred to as "intellectual assistants."

In the context of the present disclosure, it is assumed that user equipment comprises one or more artificial intelligence features implemented, e.g., by software. The system which comprises such artificial intelligence features is configured for "learning" by means of one or more machine learning methodologies to personalize the user equipment features implemented in the form of different media, services, software applications etc., taking into account various characteristics of the user of this user equipment. As a non-limiting example, personalization may be based, e.g., on user vocabulary (which is determined, e.g., when the user composes messages in instant messaging, e-mail applications, SMS, etc.), user topics of interest (determined, e.g., based on the user's search queries in various search systems), information on web pages browsed by the user, frequency and duration of browsing specific web pages, etc. In order to "train" a machine learning model, data are needed, which can be collected at the user equipment per se, however user data collection and their transfer outside of the user equipment are subject to various restrictions related to the safety of user personal data, user privacy protection etc.

Conventionally, artificial intelligence models are trained in one or more servers. However, this is connected, in particular, to the following problems: 1) an artificial intelligence system may be unable to adapt to local conditions of a given user equipment, and 2) publicly available data may differ from real data. As a rule, adaptation to local conditions of a given user equipment is implemented in the form of adaptation to the hardware part of the device, in particular to characteristics of the camera provided therein, when object recognition or super-resolution image processing tasks are to be resolved, or to characteristics of one or more microphones included in the device when speech recognition tasks are to be resolved. Adaptation to the user may be implemented on the basis of identified user interests (e.g., in word prediction when the user types messages) or based on the voice of this specific user when speech recognition tasks are to be resolved.

To solve the above-mentioned problems, adaptation of an artificial intelligence system may be implemented by executing training algorithms in the user equipment. However, in its turn, such a solution involves other problems, which includes insufficient data amount to perform adequate training of models within the user equipment, and lack of possibility to collect user data for each given user in a remote server (in particular, in view of the above-mentioned user personal data safety and privacy concerns).

In their turn, these problems are presently resolved in the related art described above by means of distributed "follow-up training" (which can also be characterized as a kind of "fine tuning," hereinafter referred to as training or follow-up training) of artificial intelligence models in a plurality of different user equipment. However, as shown above, related art solutions in this field have problems related to: 1) this "follow-up training" of artificial intelligence models may lead to situations of "overfitting" or "forgetting" all data which were initially included in the model when the model is adapted to a specific user; 2) users, their equipment and their environment may be too different to enable such distributed "follow-up training" of models in a plurality of devices; and 3) such approach is costly due to high expenses for data transmission over network connections.

The claimed subject matter has been created with regard to the above-mentioned problems of the related art. The following means for resolving the above-mentioned problems of the prior art are suggested, which will be described in more detail below in the present detailed description of the present disclosure.

1) To prevent "overfitting" and guarantee personal data security and user privacy, a small amount of initial training data is used in the model training.

2) Users are grouped into distinct groups to obtain new personalized models for each group of users.

3) In the course of distributed model training, models trained in each user equipment with regard to the above-mentioned considerations are collected, and not gradients as in the closest related art analogue discussed above.

Taking into account the above-mentioned considerations, an object to be achieved by the claimed subject matter includes improving the quality of personalized artificial intelligence models training and preventing their "overfitting" while reducing the expenses of data transmission over network connections. The present disclosure aims substantially at providing a means for continuous updates of machine learning models based on a user's data but without the need to collect any personal data of the user, with low expenses for data transmission over network connections, and improved model persistence and their frequent updates.

First, a small amount of initial training data is used in model training, which allows to prevent "overfitting" of the model ("forgetting" initial information) based on newly obtained data. Then, each user trains a model on their own user equipment during several periods and sends an updated machine learning model to the server, where the models acquired from the user equipment are averaged. Thus, each end user continuously receives updates in the form of more accurate machine learning models adapted on the basis of data generated by multiple users. By virtue of this, artificial intelligence features in respective applications in each user equipment become more accurate. The security of personal data of each user stored, e.g., in the form of photos, messages, text files, links to web pages, sound data (captured by a microphone of the user equipment) etc., is guaranteed. The trained model is prevented from "forgetting" initial information obtained when the model is trained on publicly available data.

According to the present disclosure, an initial machine learning (ML) model for a software application comprising an artificial intelligence (AI) feature is trained in a server on the basis of publicly available data. Initial ML model is supplied with the user equipment or is installed when the user equipment communicates with a communication network in the process of initial training. Then there is a waiting period until the user generates a sufficient amount of data in the course of using the application, which comprises the artificial intelligence feature, in the user equipment to enable adaptation of the machine learning model.

According to user generated data and other information which can be accessed (such as, e.g., brand and model of the user equipment) machine learning model type is identified, which is suitable for this user and user equipment. Personalization groups are formed based, as an example but not limited to, on the identified machine learning model type and/or type, brand or model of the user equipment, and/or user interests determined on the basis of user generated data during said waiting period for the purpose of machine learning model adaptation.

According to the identified machine learning model type, the server sends a current version of the machine learning model to the user equipment. In this case, in an example embodiment, certain versions of machine learning models are only sent to users within corresponding personalization groups.

To improve personal data security, a portion of publicly available data from the initial data set, which were used for initial training of the model, is sent to the user. This also prevents the machine learning model from "forgetting" initial data in case of "overfitting" of the model on specific user data. Then model training is carried out in the user equipment using the ML model which was sent from the server to the user equipment as the initial model. At this stage, training is carried out until model convergence among different user equipment is achieved, e.g., within one individualization group or until a certain predetermined maximum number of training iterations is achieved.

Each user equipment in which ML model training is completed sends its trained ML model to a server (such as a central server and/or a model aggregation server). Personalized models trained in different user equipment (e.g., within one individualization group) are aggregated at said server. Aggregation is implemented, e.g., by creating an averaged model. As a result of the aggregation, a new version of a model of a certain type is obtained. This new version of the model is sent to user equipments within a respective individualization group.

The above-described operation of sending to the user a portion of publicly available data from the initial data set, which were used for initial training of the model advantageously prevents model "overfitting" on new data in the user equipment and guarantees user privacy by preventing third parties from identifying data that characterize user personality, e.g., in case the personalized ML model sent to the server is intercepted. A portion of initial training data is sent to each of the user equipment, and the procedure of ML model training is carried out in each user equipment with combining the data collected in this user equipment and said initial data send to the user equipment. ML model adaptation in the user equipment only involves a small part of the available user data as compared to the amount of initial training data.

In other approaches which lack the operation of adding a portion of initial training data in the process of ML model training, this causes ML model "overfitting" in a given user equipment at certain time, which is characterized by the ML model "forgetting" all information which was stored in the ML model before. As a result, such "overfitted" model is unable to, e.g., adequately predict words based on user input in a scenario where a "virtual keyboard" is used in a messaging application, if the context of a message typed by the user differs from those frequent contexts, in which data for training the personalized machine learning model were previously accumulated in this user equipment.

In an example embodiment, data amounts from the initial data set and the user generated data set used for ML model training in a given user equipment are taken in a 1:1 ratio. This provides an optimal balance between new data (i.e., data generated by a user of a given user equipment) and initial data (data obtained from a server) in ML model training. In this way, the ML model "acquires" new information without "forgetting" initial information. If the ratio is, e.g., 1:2, the balance would shift towards "new" data (user generated data), which would cause the "forgetting" of initial data. However, it will be understood that the ratio is used in an example embodiment of the present disclosure, to which the scope of the present disclosure is not limited, and in other embodiments of the present disclosure, e.g., the ratio may be different for different users on the basis of certain criteria which characterize the "behavior" of each given user. For example, in certain embodiments of the present disclosure, different users may be assigned different coefficients based on the "contribution" of data which they generate into ML model training, e.g., within a certain individualization group.

To obtain such "combined" model based both on data generated by a user of a given user equipment and on the data of the initial training data set, any machine learning procedure known in the art may be used.

ML model training is performed in a user equipment until a training stop condition is met in the user equipment, such as the achievement of ML models convergence ML among the user equipment, in an example embodiment within a certain individualization group. After that the trained ML models are transmitted to the server where they are aggregated (as a non-limiting example, by averaging the ML models).

Alternatively or additionally, an ML model training stop criterion may include the achievement of a predetermined ML model quality characteristics value by the ML model, which may be expressed in terms of prediction accuracy or depending on the task: so, accuracy of word prediction may be evaluated in the task of predicting the next word; letter-wise or word-wise accuracy of text recognition may be evaluated in the task of recognizing handwritten text, etc. Different methods for evaluating ML model quality may be apparent for persons skilled in the art depending on the task to be resolved by the model based on the examples provided above.

The model may not be transmitted to the server completely but only partially: those model parameters, change of which has not exceeded a certain predetermined threshold relative to a previous iteration, may not be transmitted to the server. In this case the averaging will use the parameter value from a previous iteration of the model. The threshold for making a decision to send the ML model from the user equipment to the server may be determined, e.g., based on a tradeoff between requirements for ML model accuracy and restrictions to amounts of data transmitted over network connections between user equipment and the server.

Personalized models may be updated, e.g., on the basis of model averaging.

Instead of calculating and transmitting gradients for stochastic gradient descent, as in the case of the prior art analogue discussed above, the present disclosure includes performing ML model training in a user equipment until any one of predetermined training stop criteria is met. By way of an example, the criterion may be the achievement of a predetermined maximum number of ML model training periods or the achievement of certain models convergence according to optimization procedure. Alternatively or additionally to the aforementioned, other ML model training stop criteria are possible, which may be envisaged by persons skilled in the art upon reading the present disclosure.

This reduces the demand for data communication over network connections between the user equipment and the server for implementing the process of distributed ML models training, thus reducing economic costs for a user.

In some embodiments of the present disclosure, distributed ML model training may further increase the efficiency of the trained model predicting rare words, events, or objects. This may be achieved by modifying training criteria. This is due to the fact that in most user equipment that take part in distributed ML model training rare classes (words, objects, etc.) occur relatively seldom, which causes the ML model training process to ignore them and, consequently, brings bad prediction results for such classes. Modification of ML model training criteria may be effective in overcoming this problem if new criteria are sensitive to such classes with low probability of occurrence.

As an example, among standard training criteria one may name, e.g., cross entropy loss function between true class distribution (p) and distribution (q) which is assigned to classes by a given model. This criterion may be illustrated by the following expression provided below:

$$CE(p, q) = -\sum_{w} p(w)\log q(w) \qquad \text{Equation 1}$$

The present disclosure suggests using a new criterion in training, which is a sum of cross entropy between said p and q and Kullback-Leibler distance between q and p:

$$\text{Loss}(p, q) = -\sum_{w} p(w)\log q(w) + \sum_{w} q(w)\log\frac{q(w)}{p(w)} \qquad \text{Equation 2}$$

In the Equation 2, a penalty factor is applied to predictions of q(w) model in case additional estimate of true probability p(w) is significantly lower than q(w). Estimate p(w) may be acquired from a discriminant algorithm trained for separating real data from data selected from model q(w) using techniques that are known to ones skilled in the art. Use of such approach enables an increase in prediction accuracy in case of rate classes by up to 1.5% and causes an overall increase in prediction accuracy by up to 0.2%.

In accordance with the above-described operations of the claimed method, users are grouped in a variety of individualization groups, in particular according to the following criteria: topics of user generated text messages, user geographical location, user age, and the type of hardware on which the one or more software applications are run, and in which the one or more artificial intelligence features are used. It will be understood that the above-mentioned criteria of grouping users into individualization groups are merely a non-limiting example. and persons skilled in the art will appreciate that other criteria of grouping users into individualization groups are also possible as an alternative or in addition to the aforementioned ones. Users may be grouped into individualization groups based, e.g., on technical parameters of user equipment: screen size, RAM size, type of processor etc.; geographical location of user equipment; user generated data content, e.g., at web pages (likes, comments, replies, posts, publications, etc.); demographic metadata (user sex, age, marital status, nationality, etc.).

According to the present disclosure, it is advantageous to have separate ML models for different groups of users or user equipment. To identify the individualization group, to which a user of a given user equipment should be assigned, a classification module may be implemented in the user equipment. At least one of the following, but not limited to, may be used as input data for the classification module: user generated data in the user equipment; user equipment model; user-related demographic data; geolocation tags etc.

The number of individualization groups may be defined manually or by any suitable clustering methodology. Each individualization group corresponds to one ML model or one ML model type.

A model which is related to a specific corresponding group will have a higher accuracy than that of a model which is common for all groups. So, as a non-limiting example, users who discuss topics which are related to science and technologies via text messages in different applications in their mobile devices will get more accurate word predictions in their topics when typing messages in their user equipment, since a personalized ML model in their user equipment will only be based on data acquired from users with similar interests.

Aggregation of a plurality of ML models from users combined in a common individualization group resolves the problem of small ML model training data set size. However, in the meantime, ML models remain personalized in the sense that a separate ML model is generated and updated for each user individualization group. As a result, users within a given individualization group get more accurate personalized ML models based on their interests, habits, specifics and/or characteristics of their hardware and/or software.

In an embodiment of the present disclosure, different users may be provided with models with different architectures (different machine learning algorithms), and models with the best architecture may be identified on the basis of the results of model training. For this purpose, an additional unit may be provided at the server side for generating new ML model architectures and hyper-parameters for these models. Any AI system may also be extended by including additional functions, if necessary, which allow testing new ML models on user generated data.

The present disclosure is implemented in a wireless communication network architecture and includes hardware and/or software means at the server side and hardware and/or software means at the user equipment side. As a non-limiting example, server side means may include units and/or modules which perform the operations of providing initial ML models, initializing machine learning (ML) models at the server, distributing (sending out) ML model(s) among one or more user equipment (UEs) connected to the server by a communication network, transmitting training data of initial sample from the server to the one or more UEs, receiving ML models trained on the one or more UEs from the one or more UEs, updating the personalized ML model at the server by averaging the trained ML models received from the one or more UEs. The above-mentioned blocks and/or modules are configured to repeat the operations performed thereby any number of times which is necessary depending on the number of times the above-mentioned operations have to be repeated so as to obtain one or more personalized ML models with the needed accuracy and efficiency.

At the user equipment side, the present disclosure is also implemented using certain hardware and/or software models and/or units. As a non-limiting example, a user interface generating unit may be provided which provides a user interface that enables a user to control the UE. The UE may include various input/output means, such as, without limitation, a touchscreen, one or more keys, one or more microphones, one or more photo- and/or video cameras, positioning system signal receivers, such as GPS, GLONASS, GALILEO etc., one or more sensors for determining physical parameters of the user equipment and/or its environment, such as spatial position of the user equipment, temperature, illumination levels etc., one or more speakers. Persons skilled in the art will appreciate that the above-mentioned list of I/O means is only provided as an illustrative example and is not restrictive, and that any suitable combination of above-mentioned and/or any other I/O means may be provided, depending on the specific implementation of the user equipment.

Furthermore, various units and/or modules for text recognition, handwritten input recognition, image analysis, object identification in images, fingerprint recognition, converting speech input into text, syntax and/or statistical analysis of a natural language, generating text in a natural language, converting text into speech output etc., may be provided in the user equipment. It should be understood that this list of possible units and/or modules which allow processing data input in the user equipment by I/O means is not restrictive, and other means for processing input data and/or processing data for output may be provided depending on specific implementations of the claimed subject matter in addition or as an alternative to the aforementioned ones.

Said data processing units and/or modules transmit data derived from user input received by I/O means into one or more AI features which implement one or more machine learning (ML) models in one or more software applications run on the user equipment. One or more ML models receive said data from the data processing units and/or modules and use these data, in particular, to generate an output in response to the data received from the user, as well as for own training. Thus, e.g., in response to a user text input by means of an onscreen keyboard or one or more keys the ML model may suggest a variant of user input prediction in the form of one or more variant of a word or phrase which the user probably wishes to type in a text message typing window. In an implementation where ML model is used to identify objects in images, in response to an image from a camera of the user equipment the ML model may output a text on the screen of the user equipment with one or more variants of name(s) of object(s) recognized by the ML model in the input image. In an implementation where user speech input is recognized, the ML model may convert speech input data into a text in a natural language, which may be further analyzed (e.g. parsed), after which the ML model outputs data in the form of a text message output on a screen, which repeats the user speech input, search results output on the screen of the user equipment from a search engine and/or on a geographical map if the user speech input is recognized as a search query into an application which accesses one or more search engines and/or an application which accesses geographical maps, user location displayed, navigation routes generated etc. In an implementation where the ML model recognizes handwritten input, in response to a user input in the form of one or more fingers or a pen moving over a touchscreen surface the ML model may output suggested variants of one or more recognized characters, words or sentences on the basis of the user input.

It should be noted that the one or more ML models may be implemented by software means such as a computer program and/or one or more computer program elements, computer program modules, computer program product, etc. embodied in one or more programming languages or in the form of executable code. Besides, according to the present disclosure, the one or more ML models may be implemented using different hardware means, such as field-programmed gate arrays (FPGAs), integrated circuits, and the like. Various specific examples of software and/or hardware means suitable for implementing the one or more ML models depending on a given implementation of the claimed subject matter will be apparent to persons skilled in the art.

Communications between the server and the UE may be provided by one or more units known in the art, which perform data transmission and receipt, encoding and decoding, scrambling, encryption, conversion, etc. Communications between the UE and the server may be implemented by means of one or more communication networks which operate on the basis of any wireless communication technologies known to persons skilled in the art, such as GSM, 3GPP, LTE, LTE-A, CDMA, ZigBee, Wi-Fi, Machine Type Communication (MTC), NFC, etc. or on the basis of any wire communication technology known to persons skilled in the art. Means for data transmission and receipt between the server and the UE do not restrict the scope of the present disclosure, and combinations of one or more means for data transmission and receipt may occur to persons skilled in the art depending on a given implementation of the present disclosure.

An ML model evaluation module may also be provided in one or more embodiments of the present disclosure. Such module may be present, in particular, in the server. Based on an evaluation of ML models received by the server from various user equipment, the ML models from the various user equipment may be assigned different weights. Quality of one or more ML models is evaluated, preferably within each given individualization group to which the one or more ML models collected from the user equipment belong. On the basis of the evaluation, weights may be assigned to the ML models, according to which the personalized ML model may be further updated in the server by averaging the ML models received from the one or more UEs taking into account the assigned weights. In embodiments of the present disclosure, the averaging may not use all ML models collected from the user equipment, e.g. within a given individualization group but only models with weights above a certain predetermined threshold or within a certain range defined by upper and lower thresholds or closest to a certain predetermined value, depending on the particular implementation of the claimed subject matter.

Operation of the present disclosure has been experimentally tested for a particular case of distributed follow-up training of a model for predicting the next word in an onscreen keyboard of a mobile phone. Texts from the Wikipedia website were used in the experiment as model data for training the initial model. The initial model was trained in a virtual server (hereinafter "VS"). Messages from a Twitter dataset were used as model user data. Twitter texts were randomly distributed among virtual nodes (hereinafter "VNs") which stood for mobile devices. Then the initial model was sent out to VNs together with a portion of initial data from the Wikipedia. Data portions from Twitter and Wikipedia were used in the VNs in a 1:1 ratio (10 Kbytes each). A recurrent neural network training algorithm was run on the resulting 20 Kbytes of text until convergence was achieved, after which models trained on each of the VNs were sent to the VS where they were averaged. The model was updated in the VS and the process was repeated, wherein the Twitter data portion was updated in each of the VNs to simulate a new set of messages typed by a user.

The test has shown that after 300 iterations of the above-described algorithm the quality of next word prediction on Twitter texts, which was evaluated in terms of mean number of keystrokes, was improved by 8.5 percentage points. The quality of prediction on Wikipedia texts remained nearly the same, which points out that "forgetting" was prevented.

Privacy level guarantees measured in terms of differential privacy were experimentally tested. Experimental evaluation of privacy level points out that the probability of user data disclosure is low and is at least not worse than that in case of other similar distributed training methods.

Operation of the present disclosure will be explained below in an illustrative embodiment provided merely by way of an example and not limitation.

Sequence of operations of a method for distributed artificial intelligence (AI) machine learning (ML) model training according to the first one of the above-mentioned aspects of the present disclosure will now be discussed.

According to the inventive method, one or more machine learning (ML) models are initialized in a server at operation S1. Initialization may include training said one or more ML models on the basis of initial training data set which are publicly available data.

Then, at operation S2, said initialized one or more ML models are distributed among one or more user equipment (UEs) connected to the server by a communication network. The distribution may be implemented by transmitting data of said one or more ML models from the server to the one or more UEs using any means which are known in the field of wireless communication. As an alternative, ML models may also be distributed by other means, in particular via wire networks, on portable computer-readable mediums, etc.

At operation S3, user generated data by means of user input are accumulated in each of the one or more UEs. The data are generated by users in the course of using one or more software applications installed in the UE, as well as in the process of sending messages, making calls via one or more communication networks etc. By way of an example, the ML model to be trained may be configured to predict words and phrases when a user inputs a text message in a UE. User generated data accumulated at operation S3 may be, e.g., words and phrases input by the user when typing text messages, posts, notes etc. As another example, the ML model may be configured to recognize objects in images acquired from one or more cameras of the UE. In this case, user generated data are images which the user generates by means of one or more photo- or video cameras, provided in the UE, as well as tags which the user assigns to objects which exist in the images. Besides images from one or more cameras from the UE, object identification may also be performed by the ML model in images acquired by the UE from other sources, e.g., via a communication network from other users or by browsing websites.

In another example, the ML model may be configured to recognize handwritten input received from a user via a touchscreen of the UE and/or touchpad of the UE. In this case, the user generated data may be a handwritten input which the user performs on said touchscreen and/or touchpad, e.g., by means of one or more fingers or a pen, as well as user selection of variants of characters and/or words suggested by the ML model based on the handwritten input from the user, which the UE displays on a screen when a respective software application is executed.

In another example, the ML model may be configured to recognize speech input received from a user by means of one or more microphones provided in a UE, wherein the user generated data are said speech input and/or user selection of variants of words and/or phrases suggested by the ML model based on the speech input from the user, which the UE displays on a screen when a respective software application is executed.

In yet another example, the ML model may be configured to recognize one or more characteristics of environment of a UE and/or one or more user actions. Characteristics of environment of the UE may be, without limitation, time, date, weekday, illumination levels, air temperature, air humidity level, geographical location of the UE, spatial position of the UE. The user generated data are a user input into one or more software applications in the UE. In this example, the ML model may suggest, e.g., different actions to the user for controlling different software applications in the UE and/or automatically initiate certain actions in certain software applications.

User generated data are accumulated in the UE during a predetermined data accumulation period. When user data accumulated in the UE reach a predetermined amount, the UE may transmit a message to the server that the necessary amount of data has been accumulated.

At operation S4, the server transmits training data to the UE, which are a portion of initial data set that had been used at operation S1 in the initial training of the ML model. These data are publicly available and do not characterize any particular user. Involvement of initial data set in ML model training guarantees user personal data safety and prevents "overfitting" of ML model in the UE.

Then, at operation S5, the ML model is trained in each of the one or more UEs on the basis of said collected data and said training data until a training stop criterion is met. A training stop criterion may be, by way of a non-limiting example, achievement of ML models convergence among the one or more UEs or achievement of a predetermined ML model quality characteristic value by the ML model, or when a predetermined number of ML model training periods is achieved.

At operation S6, trained ML models are obtained at the server from said one or more UEs. This operation includes transmitting ML models trained in respective UEs, e.g., to the server by means of a wireless communication network. The server collects ML models trained in different UEs.

At operation S7, the server updates the ML model by averaging the trained ML models acquired from the one or more UEs. As a non-limiting example, said ML model update may include aggregating at the server personalized ML models acquired from the one or more UEs. As a result of aggregation, a new version of ML model is provided, which is based on the personalized ML models trained in the one or more UEs and collected at the server.

At operation S8, the new version of the ML model provided by the averaging is sent by the server to the one or more UEs. As a non-limiting example, this sending is performed by commonly known wireless communication network means.

Operations S3-S8 may be repeated one or more times, e.g., until an ML model is obtained which meets one or more ML model quality criteria. This results in a personalized ML model with "follow-up training" based on user generated data from different UEs, as well as an initial data set which was used in the initial training of the ML model at the server.

In at least one of the embodiments of the present disclosure, the method may further comprise a step of identifying one or more personalization groups for the users of each of the one or more UEs based on user generated data collected in said each of the one or more UEs. Further, according to said at least one of the embodiments, the method comprises grouping, at the server, the ML models acquired from said one or more UEs into personalization groups; and transmitting the updated ML models grouped into the personalization groups only to the UEs within a given personalization group. Additional personalization of trained ML models is thus achieved, and accuracy of ML models for different groups of users is improved.

Figure 4:
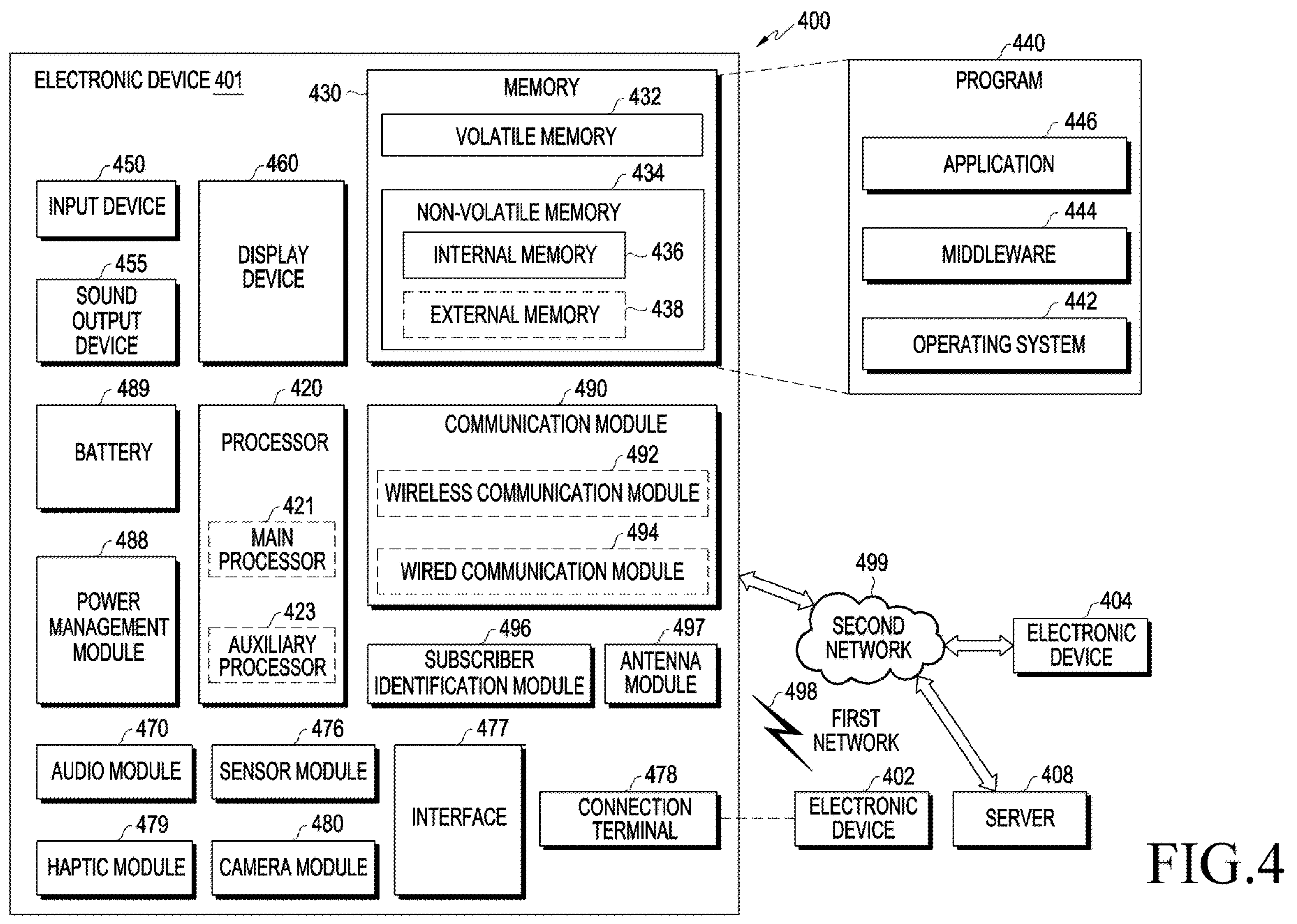
FIG. 4 is a block diagram illustrating an electronic device (e.g., one or more UEs) in a network environment according to various embodiments.

FIG. 4 is a block diagram illustrating an electronic device (for example, one or more UEs) 401 in a network environment 400 according to various embodiments. Referring to FIG. 4, the electronic device 401 in the network environment 400 may communicate with an electronic device 402 via a first network 498 (e.g., a short-range wireless communication network), or an electronic device 404 or a server 408 via a second network 499 (e.g., a long-range wireless communication network). According to an embodiment, the electronic device 401 may communicate with the electronic device 404 via the server 408. According to an embodiment, the electronic device 401 may include a processor 420, memory 430, an input device 450, a sound output device 455, a display device 460, an audio module 470, a sensor module 476, an interface 477, a haptic module 479, a camera module 480, a power management module 488, a battery 489, a communication module 490, a subscriber identification module(SIM) 496, or an antenna module 497. In some embodiments, at least one (e.g., the display device 460 or the camera module 480) of the components may be omitted from the electronic device 401, or one or more other components may be added in the electronic device 401. In some embodiments, some of the components may be implemented as single integrated circuitry. For example, the sensor module 476 (e.g., a fingerprint sensor, an iris sensor, or an illuminance sensor) may be implemented as embedded in the display device 460 (e.g., a display).

The processor 420 may execute, for example, software (e.g., a program 440) to control at least one other component (e.g., a hardware or software component) of the electronic device 401 coupled with the processor 420, and may perform various data processing or computation. According to one embodiment, as at least part of the data processing or computation, the processor 420 may load a command or data received from another component (e.g., the sensor module 476 or the communication module 490) in volatile memory 432, process the command or the data stored in the volatile memory 432, and store resulting data in non-volatile memory 434. According to an embodiment, the processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or to be specific to a specified function. The auxiliary processor 423 may be implemented as separate from, or as part of the main processor 421.

The auxiliary processor 423 may control at least some of functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to an embodiment, the auxiliary processor 423 (e.g., an image signal processor or a communication processor) may be implemented as part of another component (e.g., the camera module 480 or the communication module 490) functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thererto. The memory 430 may include the volatile memory 432 or the non-volatile memory 434.

The program 440 may be stored in the memory 430 as software, and may include, for example, an operating system (OS) 442, middleware 444, or an application 446.

The input device 450 may receive a command or data to be used by other component (e.g., the processor 420) of the electronic device 401, from the outside (e.g., a user) of the electronic device 401. The input device 450 may include, for example, a microphone, a mouse, a keyboard, or a digital pen (e.g., a stylus pen).

The sound output device 455 may output sound signals to the outside of the electronic device 401. The sound output device 455 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. According to an embodiment, the display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. According to an embodiment, the audio module 470 may obtain the sound via the input device 450, or output the sound via the sound output device 455 or a headphone of an external electronic device (e.g., an electronic device 402) directly (e.g., wiredly) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. According to an embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device (e.g., the electronic device 402) directly (e.g., wiredly) or wirelessly. According to an embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device (e.g., the electronic device 402). According to an embodiment, the connecting terminal 478 may include, for example, a HDMI connector, a USB connector, a SD card connector, or an audio connector (e.g., a headphone connector).

The haptic module 479 may convert an electrical signal into a mechanical stimulus (e.g., a vibration or a movement) or electrical stimulus which may be recognized by a user via his tactile sensation or kinesthetic sensation. According to an embodiment, the haptic module 479 may include, for example, a motor, a piezoelectric element, or an electric stimulator.

The camera module 480 may capture a still image or moving images. According to an embodiment, the camera module 480 may include one or more lenses, image sensors, image signal processors, or flashes.

The power management module 488 may manage power supplied to the electronic device 401. According to one embodiment, the power management module 488 may be implemented as at least part of, for example, a power management integrated circuit (PMIC).

The battery 489 may supply power to at least one component of the electronic device 401. According to an embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the application processor (AP)) and supports a direct (e.g., wired) communication or a wireless communication. According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth™, wireless-fidelity (Wi-Fi) direct, or infrared data association (IrDA)) or the second network 499 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 401. According to an embodiment, the antenna module 497 may include an antenna including a radiating element composed of a conductive material or a conductive pattern formed in or on a substrate (e.g., PCB). According to an embodiment, the antenna module 497 may include a plurality of antennas. In such a case, at least one antenna appropriate for a communication scheme used in the communication network, such as the first network 498 or the second network 499, may be selected, for example, by the communication module 490 (e.g., the wireless communication module 492) from the plurality of antennas. The signal or the power may then be transmitted or received between the communication module 490 and the external electronic device via the selected at least one antenna. According to an embodiment, another component (e.g., a radio frequency integrated circuit (RFIC)) other than the radiating element may be additionally formed as part of the antenna module 497.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 401 and the external electronic device 404 via the server 408 coupled with the second network 499. Each of the electronic devices 402 and 404 may be a device of a same type as, or a different type, from the electronic device 401. According to an embodiment, all or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 440) including one or more instructions that are stored in a storage medium (e.g., internal memory 436 or external memory 438) that is readable by a machine (e.g., the electronic device 401). For example, a processor (e.g., the processor 420) of the machine (e.g., the electronic device 401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An user equipment (UE) comprising:

a communication circuit;

memory storing instructions; and at least one processor, wherein the instructions which, when executed by the at least one processor, cause the UE to:

obtain user generated data based on user input of a user of the UE;

receive, via the communication circuit, training data from a server connected to the UE, wherein the training data includes publicly available data;

train a machine learning (ML) model based on the user generated data, the training data, and a sum of a cross entropy and a Kullback-Leibler distance between a true class distribution and a distribution which are assigned to classes by the ML model, until a training stop criterion is met, wherein the training stop criterion includes at least one of an achieved convergence of ML models among one or more UEs including the UE, a predetermined ML model quality characteristic value being achieved by the ML model, or an achieved predetermined number of training periods;

transmit, via the communication circuit, the trained ML model to the server; and receive an updated ML model which is generated by the server aggregating a plurality of trained ML models from a plurality of UEs of users in a personalization group which is formed based on a brand of the UE and user interests which is determined based on the user generated data during a waiting period for the user to generate sufficient amount of data for adaption of the ML model, wherein the personalization group includes a user of the UE, wherein the updated ML model is transmitted only to UEs within the personalization group.

2. The UE of claim 1, wherein the instructions, when executed by the at least one processor, cause the UE to receive the updated ML model that is configured to predict first words and phrases of text input to the UE, wherein the user generated data includes second words and phrases input by the user of the UE.

3. The UE of claim 1, wherein the instructions, when executed by the at least one processor, cause the UE to receive the updated ML model that is configured to identify first objects in first images acquired from one or more cameras of the UE, wherein the user generated data includes second images from the one or more cameras of the UE or tags assigned by the user of the UE to second objects which are present in the second images.

4. The UE of claim 1, wherein the instructions, when executed by the at least one processor, cause the UE to receive the updated ML model that is configured to recognize first handwritten input received from the user via a touchscreen of the UE or a touchpad of the UE, wherein the user generated data includes second handwritten input by the user of the UE or a selection by the user of variants of characters or words suggested by the ML model based on the second handwritten input from the user.

5. The UE of claim 1, wherein the instructions, when executed by the at least one processor, cause the UE to receive the updated ML model that is configured to recognize first voice input received from the user of the UE by one or more microphones of the UE, wherein the user generated data includes second voice input and/or a by the user of selection of variants of words or phrases suggested by the ML model based on the second voice input from the user.

6. The UE of claim 1, wherein the instructions, when executed by the at least one processor, cause the UE to receive the updated ML model that is configured to recognize one or more characteristics of an environment of the UE or one or more user actions, wherein the one or more characteristics of the environment of the UE include a time, a date, a weekday, an illumination, a temperature, a geographical location, or a spatial position of the UE, and wherein the user generated data includes a user input to one or more applications of the UE.

7. A method of a user equipment (UE) for distributed training of an artificial intelligence (AI) machine learning (ML) model, the method comprising:

obtaining user generated data based on user input of a user of the UE;

receiving training data from a server, wherein the training data includes publicly available data;

training the AI ML model based on the data, the training data, and a sum of a cross entropy and a Kullback-Leibler distance between a true class distribution and a distribution which are assigned to classes by the AI ML model, until a training stop criterion is met, wherein the training stop criterion includes at least one of an achieved convergence of AI ML models among one or more UEs including the UE, a predetermined AI ML model quality characteristic value being achieved by the AI ML model or an achieved predetermined number of training periods; and transmitting the trained AI ML model to the server; and receiving an updated AI ML model which is generated by the server aggregating a plurality of trained ML models from a plurality of UEs of users in a personalization group which is formed based on a brand of the UE and user interests which is determined based on the user generated data during a waiting period for the user to generate sufficient amount of data for adaption of the AI ML model, wherein the personalization group includes a user of the UE, wherein the updated AI ML model is transmitted only to UEs within the personalization group.

8. The method of claim 7, further comprising receiving, using at least one processor, the updated AI ML model that is configured to predict first words and phrases of text input to the UE, wherein the user generated data includes second words and phrases input by the user of the UE.

9. The method of claim 7, further comprising receiving, using at least one processor, the updated AI ML model that is configured to identify first objects in first images acquired from one or more cameras of the UE, wherein the user generated data includes second images from the one or more cameras of the UE or tags assigned by the user of the UE to second objects which are present in the second images.

10. The method of claim 7, further comprising receiving, using at least one processor, the updated AI ML model that is configured to recognize first handwritten input received from the user via a touchscreen of the UE or a touchpad of the UE, wherein the user generated data includes second handwritten input by the user of the UE or a selection by the user of variants of characters or words suggested by the ML model based on the second handwritten input from the user.

11. The method of claim 7, further comprising receiving, using at least one processor, the updated AI ML model that is configured to recognize first voice input received from the user of the UE by one or more microphones of the UE, wherein the user generated data includes second voice input and/or a by the user of selection of variants of words or phrases suggested by the ML model based on the second voice input from the user.

12. The method of claim 7, further comprising receiving, using at least one processor, the updated AI ML model that is configured to recognize one or more characteristics of an environment of the UE or one or more user actions, wherein the one or more characteristics of the environment of the UE include a time, a date, a weekday, an illumination, a temperature, a geographical location, or a spatial position of the UE, and wherein the user generated data includes a user input to one or more applications of the UE.

13. A non-transitory computer-readable medium storing instructions, the instructions comprising: one or more instructions that, when executed by one or more processors of a user equipment (UE), cause the UE to:

obtain user generated data based on user input of a user of the UE;

receive, via a communication circuit, training data from a server connected to the UE, wherein the training data includes publicly available data;

train a machine learning (ML) model based on the user generated data, and the training data, and a sum of a cross entropy and a Kullback-Leibler distance between a true class distribution and a distribution which are assigned to classes by the ML model, until a training stop criterion is met, wherein the training stop criterion includes at least one of an achieved convergence of ML models among one or more UEs including the UE, a predetermined ML model quality characteristic value being achieved by the ML model, or an achieved predetermined number of training periods;

transmit, via the communication circuit, the trained ML model to the server; and receive an updated ML model which is generated by the server aggregating a plurality of trained ML models from a plurality of UEs of users in a personalization group which is formed based on a brand of the UE and user interests which is determined based on the user generated data during a waiting period for the user to generate sufficient amount of data for adaption of the ML model, wherein the personalization group includes a user of the UE, wherein the updated ML model is transmitted only to UEs within the personalization group.

14. The non-transitory computer-readable medium according to claim 13, wherein the one or more instructions, when executed by one or more processors of a user equipment (UE), cause the UE to receive the updated ML model that is configured to predict first words and phrases of text input to the UE, wherein the user generated data includes second words and phrases input by the user of the UE.

15. The non-transitory computer-readable medium according to claim 13, wherein the one or more instructions, when executed by one or more processors of a user equipment (UE), cause the UE to receive the updated ML model that is configured to identify first objects in first images acquired from one or more cameras of the UE, wherein the user generated data includes second images from the one or more cameras of the UE or tags assigned by the user of the UE to second objects which are present in the second images.

16. The non-transitory computer-readable medium according to claim 13, wherein the one or more instructions, when executed by one or more processors of a user equipment (UE), cause the UE to receive the updated ML model that is configured to recognize first handwritten input received from the user via a touchscreen of the UE or a touchpad of the UE, wherein the user generated data includes second handwritten input by the user of the UE or a selection by the user of variants of characters or words suggested by the ML model based on the second handwritten input from the user.

17. The non-transitory computer-readable medium according to claim 13, wherein the one or more instructions, when executed by one or more processors of a user equipment (UE), cause the UE to receive the updated ML model that is configured to recognize first voice input received from the user of the UE by one or more microphones of the UE, wherein the user generated data includes second voice input and/or a by the user of selection of variants of words or phrases suggested by the ML model based on the second voice input from the user.

* * * * *